US006739094B1

(12) United States Patent
Berry et al.

(10) Patent No.: US 6,739,094 B1
(45) Date of Patent: May 25, 2004

(54) SEAL WITH COMPLIANT MAGNETIC APPENDAGE

(75) Inventors: David Harold Berry, Northville, MI (US); Zuoxing Yu, Stratford (CA); Jonathan William Edward Stanley, Almont, MI (US)

(73) Assignee: Cooper Technology Services, LLC, Findlay, OH (US)

( * ) Notice: Subject to any disclaimer, the term of this patent is extended or adjusted under 35 U.S.C. 154(b) by 0 days.

(21) Appl. No.: 09/667,258

(22) Filed: Sep. 22, 2000

(51) Int. Cl.7 .................................................. E06B 7/16
(52) U.S. Cl. ...................................... 49/478.1; 49/498.1
(58) Field of Search ............................ 49/478.1, 498.1, 49/441

(56) References Cited

U.S. PATENT DOCUMENTS

| | | | |
|---|---|---|---|
| 2,959,832 A | 11/1960 | Baermann | |
| 3,362,108 A | 1/1968 | Jones | |
| 4,240,228 A | 12/1980 | Okamura | |
| 4,294,485 A | 10/1981 | Englehard | |
| 4,469,383 A | 9/1984 | Losert | |
| 4,535,563 A | 8/1985 | Mesnel | |
| 4,592,180 A | 6/1986 | Gerritsen | |
| 4,644,698 A | 2/1987 | Gerdes et al. | |
| 4,653,819 A | 3/1987 | Swerbinsky | |
| 4,753,042 A | 6/1988 | Adkins | |
| 4,832,396 A | 5/1989 | Moreno et al. | |
| 4,865,915 A | * 9/1989 | Okonogi et al. | 428/336 |
| 4,882,821 A | 11/1989 | Sims, Jr. | |
| 4,999,951 A | 3/1991 | Keys et al. | |
| 5,077,948 A | 1/1992 | Olson et al. | |
| 5,161,346 A | 11/1992 | Olson et al. | |
| 5,257,791 A | 11/1993 | Cittadini et al. | |
| 5,367,831 A | 11/1994 | Gunkel | |
| 5,575,485 A | 11/1996 | Merla et al. | |
| 5,606,828 A | 3/1997 | Hall et al. | |
| 5,628,150 A | * 5/1997 | Mesnel | 49/440 |
| 5,634,644 A | 6/1997 | Guillon | |
| 5,651,217 A | * 7/1997 | Mesnel | 49/441 |
| 6,023,888 A | * 2/2000 | Dover | 49/441 |
| 6,131,341 A | * 10/2000 | Wade et al. | 49/478.1 |

* cited by examiner

Primary Examiner—Daniel P. Stodola
(74) Attorney, Agent, or Firm—Fay, Sharpe, Fagan, Minnich & McKee, LLP

(57) ABSTRACT

A weatherseal employing a magnetic appendage for enhancing the sealing with a mounting surface. The weatherseal includes an elastomeric base that conforms to and engages the mounting surface. The seal portion extends from the base for selective engagement with a second surface, such as a door of a vehicle. An appendage is fabricated from a magnetic elastomer that is sufficiently flexible to conform to irregularities in the mounting surface. Preferably, only the appendage is formed of the magnetic elastomer to achieve an effective seal with only a small amount of the expensive magnetic elastomer to enhance the seal with the mounting surface and avoid, for example, the use of more expensive welded mounting channels that add undesired weight to the vehicle.

20 Claims, 3 Drawing Sheets

SEAL WITH COMPLIANT MAGNETIC APPENDAGE

BACKGROUND OF THE INVENTION

1. Field of the Invention

This invention relates to sealing systems, and more particularly to a weatherseal or weatherstrip employed with a vehicle door that enhances the seal between the weatherstrip and a surface to which it is attached.

2. Discussion of the Art

It is well known in the art to use an extruded weatherseal that seals the gap between a door and a body of a vehicle. Under conventional practice, a mounting region or base of the seal is secured to the door with a metal C-channel that is spot welded to the door. Enclosing edges retain the weatherseal in position in the C-channel. Moreover, by spot welding the C-channel to the door, water is prevented from running or passing beneath the weatherseal. Although a continuous water tight seal is obtained, it is an expensive assembly and thus adds to both the cost and the weight of the vehicle. Using a C-channel requires a vehicle manufacturer to roll form, stretch-bend, cut-to-length, and spot weld the C-channel. Numerous problems are associated with this assembly and it still does not provide a foolproof manner of preventing water ingress into the vehicle. Flange mounted seals are another area where water intrusion between the seal and the seal mounting region, i.e., the flange, is a concern.

Door mounted weatherseals or weatherstrips are designed to fit to and seal the vehicles. Compliancy of the weatherseal is important in order to adequately seal the vehicle. That is, the weatherseal must be sufficiently flexible so that it will fit many irregular surfaces or curved surfaces, and still maintain a seal. Thus, any proposed solution to the water ingress problem along the mounting surface must still adequately address the need for compliancy in the remainder of the weatherseal.

Although others have suggested using a magnetic rubber formulation as a part of a door mounted weatherseal, the desired savings in the manufacturing costs and weight do not outweigh the increased costs of using an expensive magnetic rubber formulation. That is, others have suggested magnetic sealing where the target is the sealing surface, i.e., in the case of a door mounted seal, the vehicle body is the target and the magnetic seal enhances the sealing contact with the body.

Accordingly, a need exists for an effective weatherseal in the vehicle door environment that is effective and provides increased savings.

SUMMARY OF THE INVENTION

An improved weatherseal includes a base that conforms to and engages an associated first surface. A seal portion extends from the base and selectively engages a second surface or target when the first and second surfaces are disposed in close proximity. An appendage is fabricated from a magnetic elastomer and is sufficiently flexible to conform to irregularities in the first surface.

The base, seal portion, and magnetic appendage are preferably coextruded.

The weatherseal is secured to the first surface at spaced locations via attachment members or pegs which eliminate use of a welded C-channel.

A corrosion resistant layer is preferably added to the magnetic appendage.

A primary benefit of the invention relates to the significant savings to the vehicle manufacturer as a result of reduced weight and costs.

Another benefit of the invention resides in the continuous water tight seal formed between the weatherseal and the mounting surface to which it is attached.

Another benefit of the invention resides in the ability of the weatherseal to conform to irregularities in the mounting surface and prevent water from running beneath the seal and leaking into the interior of the vehicle.

Yet another advantage of the invention is realized by the flexibility of the weatherseal to fit normal variations in sheet metal contours of the mounting surface.

Still other advantages and benefits will become apparent to those skilled in the art upon reading and understanding the following detailed description.

DETAILED DESCRIPTION OF THE PREFERRED EMBODIMENTS

Figure 1:
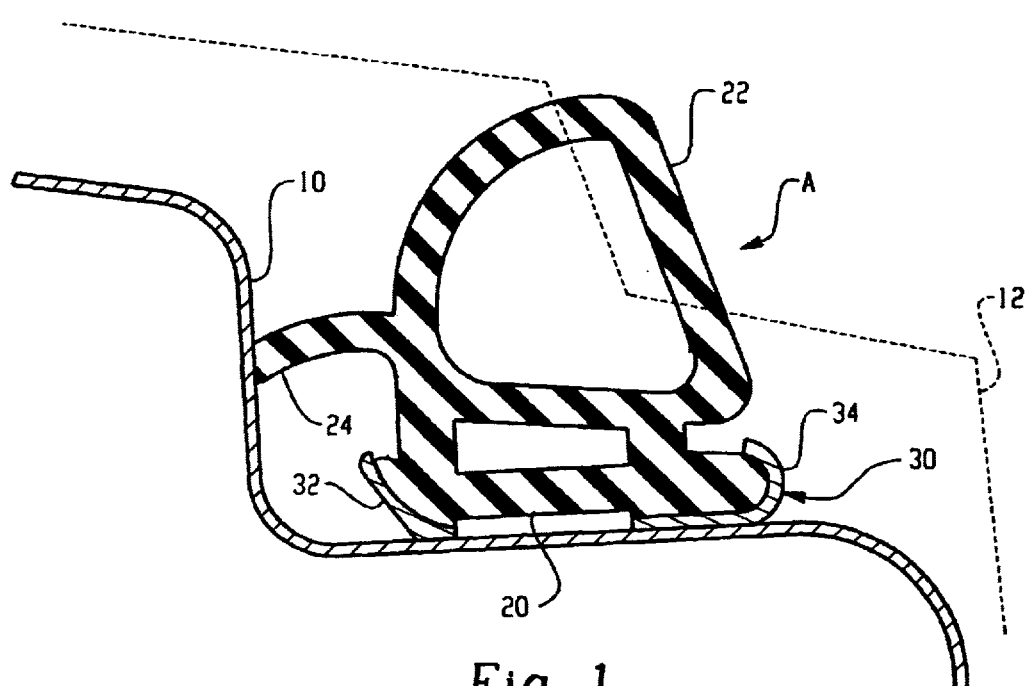
FIG. 1 is a cross-sectional view of a prior art manner of securing a weatherseal to a mounting surface.

FIG. 1 is representative of a prior art manner of securing a weatherseal or weatherstrip A to a first surface, or mounting surface, 10. As will be appreciated, the mounting surface in the exemplary embodiment is illustrated as an upper portion of a vehicle door. A second surface or target 12 is shown in dotted line and represents a vehicle body adjacent the vehicle door. The weatherseal A includes a base 20, sealing portion 22, and an appendage or flange 24. As shown in FIG. 1, a generally planar portion of the weatherseal base is secured to a generally planar portion of the mounting surface via a C-channel 30 that is welded to the mounting surface. Arc-shaped ends 32, 34 of the C-channel cooperate with the configuration of the base to secure the weatherseal. In addition, the welded C-channel prevents water from passing beneath the seal and entering the interior of the vehicle. Although the C-channel is effective in preventing water from passing beneath the weatherseal and maintaining the seal in proper position, it is expensive for vehicle manufacturers to produce. In addition, the C-channel adds additional weight to the vehicle. Moreover, manufacturing the C-channel is labor intensive and the final assembly still encounters problems in preventing water from ingress into the vehicle.

The sealing portion 22 is shown as a hollow, bulbous, flexible member and is adapted for sealing engagement with the second surface 12. It is compressed and conforms to the contour of the second surface to provide a seal region over an adequate region when the door and body are disposed in a closed or proximate position. One skilled in the art will appreciate that other configurations of the sealing portion may be used without departing form the scope and intent of the present invention.

Appendage 24 extends outwardly from the weatherseal for engagement with the mounting surface. Particularly, the appendage is adapted for engagement with a portion of the mounting surface that extends approximately 90° relative to that region that receives the C-channel. It will be appreciated, however, that the appendage is designed for engagement with the mounting surface irrespective of its particular orientation, i.e., the mounting surface need not adopt a 90° configuration.

Figure 2:
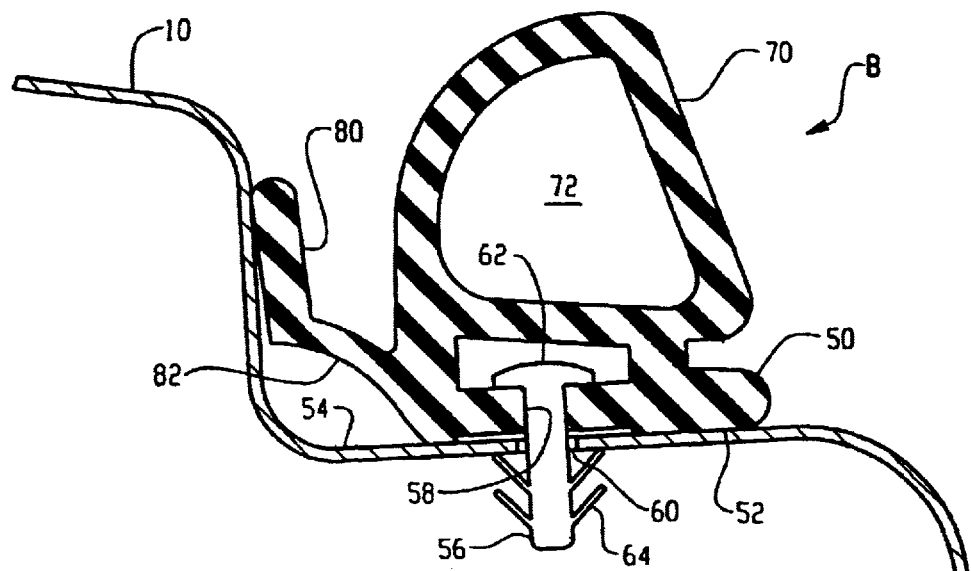
FIG. 2 is a cross-sectional view of the new weatherseal formed in accordance with the present invention.

FIG. 2 illustrates a first preferred embodiment of a weatherseal B formed in accordance with the present invention. Mounting surface 10 is illustrated to be substantially identical to that shown in FIG. 1 for purposes of comparison only. Likewise, the second surface (vehicle body) has been removed for ease of illustration, although it will be understood that the second weatherseal is adapted for engagement with such a second surface. The weatherseal B includes an elastomeric base 50 that has a generally planar lower surface 52 adapted for engagement with planar region 54 of the mounting surface. Since the C-channel is eliminated, a series of axially spaced attachment members or pegs 56 are received through aligned openings 58, 60 formed in the base 50 of the weather seal and the mounting surface region 54, respectively. The attachment peg includes an enlarged head 62 that engages the base of the weatherseal. Outwardly diverging fingers 64 are adapted to flex inwardly during insertion through the openings 58, 60 and then flex outwardly to the position shown in FIG. 2 to prevent inadvertent removal of the attachment pegs. It will be recognized, however, that the weatherseal may be secured to the mounting surface in a number of different manners, although the disclosed mounting pegs are preferred due to ease of manufacture and use.

Seal portion 70 of the weatherseal B is preferably a hollow, bulbous portion. Just as the elastomeric base may be manufactured from various materials, the seal portion may be formed from a flexible material such as an elastomer that is easily coextruded and exhibits desired material properties such as chemical resistance, weather resistance, elastomeric properties over a range of temperatures, good aging, and suitable modulus, hardness, and strength as required for use as a vehicle weatherseal. The hollow cavity 72 of the seal portion is also useful in providing desired flexibility and conformance of the seal portion to the second surface.

Appendage 80 of the weatherseal extends outwardly from the base and seal portion for engagement with the mounting surface 10. In accordance with the present invention, the appendage is compliant and magnetically attracted to the mounting surface with sufficient force to prevent water from passing beneath the weatherseal. Compliancy is important in order to seal the vehicle. That is, the appendage must be sufficiently flexible to allow the force of the magnetized elastomer to pull the sealing appendage into contact with the sheet metal of the mounting surface and must be flexible enough to fit to the normal variation in sheet metal contours.

Preferably, the magnetized rubber or elastic is a rubber formulation in which one hundred parts by weight is the standard amount of elastomer content in the formulation. Preferred elastomer materials include styrene-butadiene rubber (SBR), natural rubber (NR), polyisoprene (IR), butyl and halobutyl rubber (IIR), polychloroprene (CR), polybutadiene (BR), chlorinated and chlorosulfonated polyethylene (CSM), nitrile (NBR), and ethylene-propylene copolymer and terpolymer (EPDM), or any other standard elastomer that exhibits like characteristics. Other ingredients are added to the one hundred (100) parts of elastomer to prepare a typical rubber formulation. In order to achieve the desired magnetic properties of the present invention, one hundred fifty (150) to one thousand eight hundred (1800) parts, with a preferred amount of approximately eight hundred (800) parts, of magnetizing powder is added to the elastomer. The magnetizing powder can be neodymium iron boron, strontium ferrite, barium ferrite, or any blend of the three. The magnetic powder is interspersed through the elastomer and the solid cross-sectional shape of the appendage has sufficient flexibility measured on the order of 100% modulus of about 0.5 to 0.7 Mpa, a 200% modulus of about 1.4 to 1.6 Mpa, and a 300% modulus of about 2.2 to 2.5 Mpa, and has a hardness on the order of 45 to 55 A. In effect, the magnetic appendage exhibits a magnetic holding pressure on the order of about 1.2 psi.

The magnetic powder in the compound may be magnetized after the compound passes through the extrusion die. That is, the rubber may be either cured or uncured when the magnetizing occurs at any time after passing through the extrusion die. It is contemplated that the magnetizing may occur immediately after extrusion or days later.

Since the magnetic rubber formulation is expensive when compared to normal rubber formulations, the present invention advantageously uses a relatively small amount of magnetic compound. The preferred arrangement of the subject invention uses the magnetic rubber formulation in the compliant appendage area which is approximately less than 10% of the total cross-sectional area of the extruded rubber profile. Cost is maintained sufficiently low so that vehicle manufacturers find it desirable to use.

By magnetizing only the appendage of the weatherseal, rather than using the new magnetic compound throughout the weatherseal, other significant advantages are achieved. For example, the base of the weatherseal must be drilled to form openings that receive the attachment pegs. Drilling through a magnetizing powder would quickly dull the drill and render such a configuration impractical for manufacturing. Thus eliminating use of the magnetic powder in the base avoids this problem. Others have suggested using the magnetic rubber formulation in the seal portion 70 to enhance and provide a magnetic sealing with the second surface. This is not believed to be cost justified. The present invention, on the other hand, is directed to enhancing the seal between the weatherseal and the mounting surface. The flexibility of the magnetic rubber fits irregular surfaces or curved surfaces and still maintains an adequate seal to prevent water from passing beneath the weatherseal.

Figure 3:
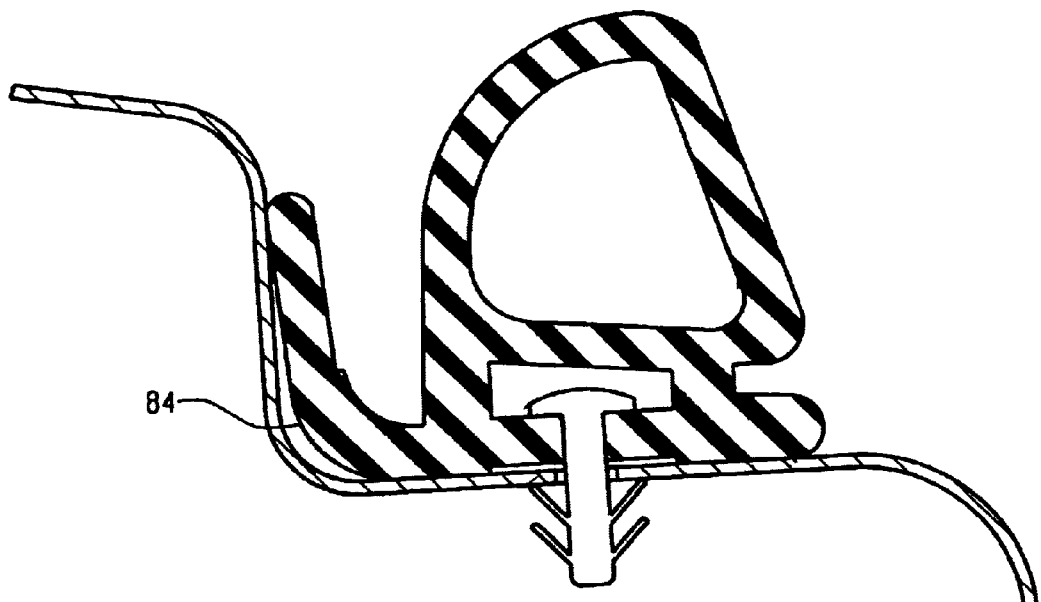
FIG. 3 is a cross-sectional view similar to FIG. 2 and illustrating a second embodiment of the invention secured to a mounting surface.
Figure 4:
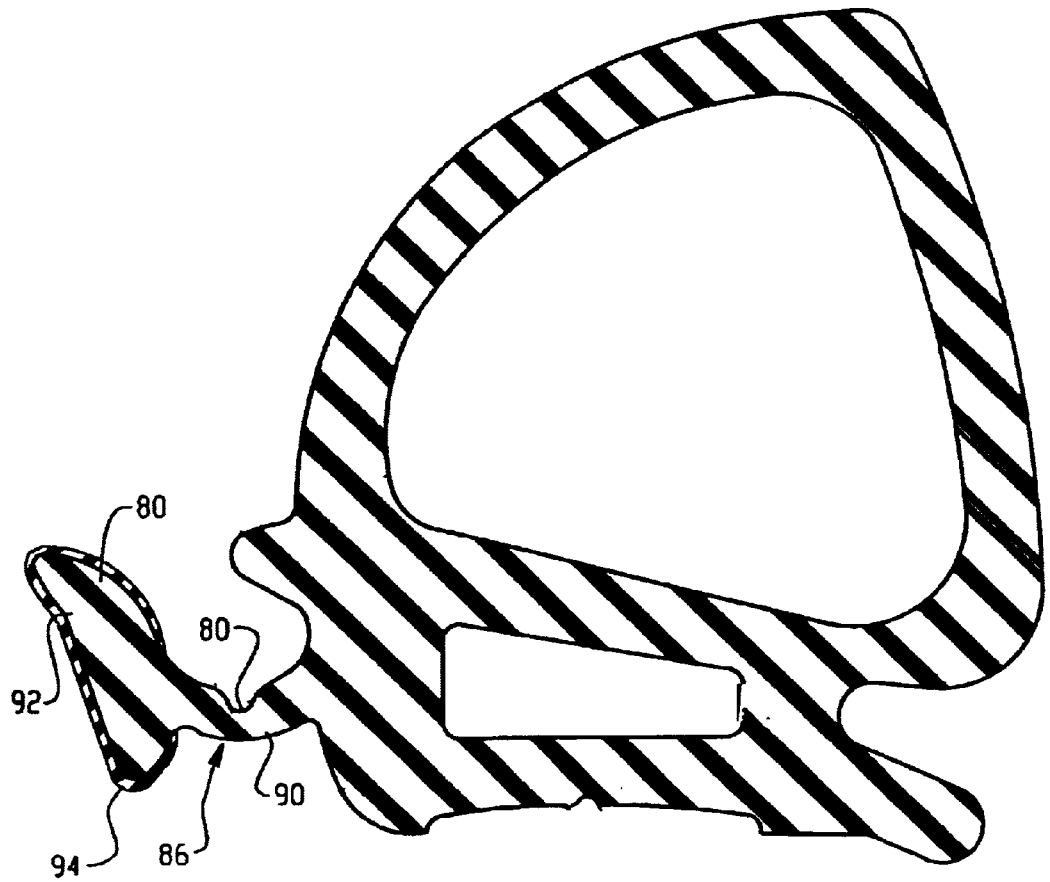
FIG. 4 is an enlarged cross-sectional view of another preferred embodiment of the present invention.

An arm 82 of the appendage in FIG. 2 (shown without magnetic powder) is oppositely contoured to that of the mounting surface. This is contrasted to arm 84 in the embodiment of FIG. 3 that more generally conforms to the configuration of the mounting surface. Still another arrangement is shown in FIG. 4, where the interconnecting arm 86 includes a groove 88 to define a narrow neck region 90 that enhances the flexibility of the appendage.

A sealing lip 92 is also provided at one end of the magnetic appendage to provide an initial line contact with the mounting surface that assures engagement of the appendage with the mounting surface.

The magnetic elastomers described above provide a strong magnetic pull and thus permit it to be used in smaller portions which, in turn, provides increased flexibility of the assembly. The magnetizing powders, though, are susceptible to rusting or corrosion and thus consideration must also be made to provide a corrosion-resistant feature. This is represented in FIG. 4 as a coating or layer 94 provided over the magnetic appendage. For example, a thick coating of a corrosion-resistant material can be applied that would not inhibit the magnetic flux strength of the compound. Another possibility is to extrude a thin covering of dense rubber over the magnetizing powder. The dense rubber covering would inhibit moisture from contacting the magnetizing powder and likewise inhibit resulting corrosion. Still another consideration is to wrap a plastic film over the extruded magnetic appendage as a corrosion resistant feature.

Figure 5:
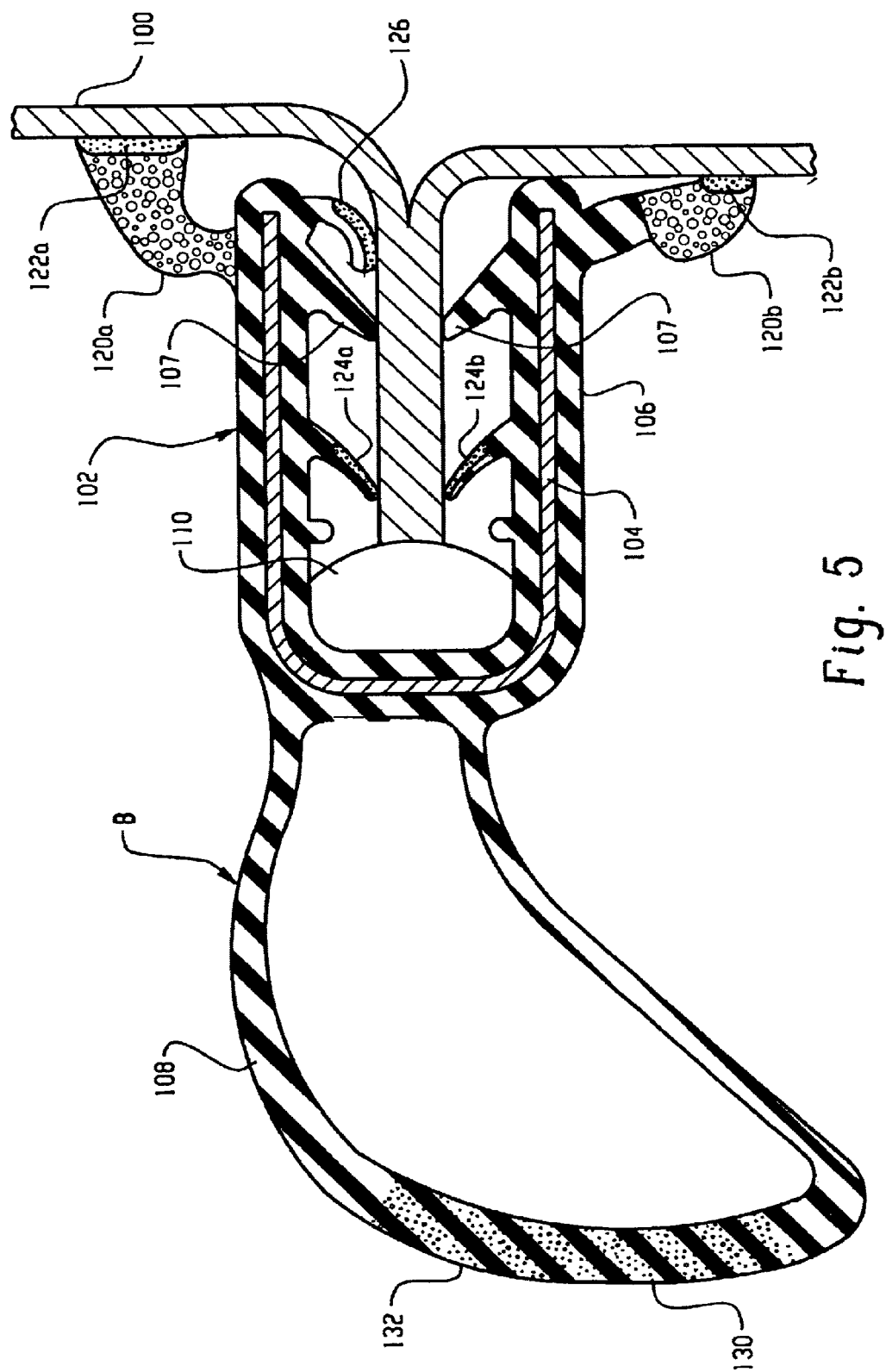
FIG. 5 is a cross-sectional view of a flange mounted seal formed in accordance with the present invention.

FIG. 5 illustrates yet another embodiment of the invention using a magnetic compound in selected regions of the weatherseal to further preclude water ingress. Particularly, a flange mounted weatherseal B is secured to a flange or mounting surface 100 via a base or carrier 102 that has a generally U-shaped profile. Typically, the carrier includes a rigid core 104 that is encapsulated by an elastomeric material 106 such as dense rubber. Gripping or retention fingers protrude inwardly from the carrier for selective engagement with the flange 100. A flexible, hollow sealing portion 108 is integrally formed with the carrier and extends outwardly therefrom for selective sealing engagement with a target surface (not shown) in a manner well known in the art. Of course the sealing portion may adopt a wide variety of configurations without departing from the scope and intent of the present invention. The flange mounted weatherseal B may also include a hot melt sealer 110 within the hollowed cavity defined by the carrier. For example, a foam hot melt sealer can be used to provide a sealed interface between the terminal edge of the flange and a bight portion 112 of the carrier.

In accordance with the teachings of the invention, one or more appendages 120a, 120b extend from the weatherseal, specifically from the carrier or engagement with the mounting surface. Here, the appendages 120a, 120b are disposed on opposite sides of the carrier and are preferably formed from a sponge rubber material such as a closed cell EPDM. A magnetic compound 122a, 122b is received in a portion of the appendages to enhance the sealing engagement between the appendage and the mounting surface. As noted above, this arrangement is desirable since only selected portions of the weatherseal include the magnetic compound so that the overall cost remains reasonable.

Also shown in FIG. 5 is the inclusion of the magnetic compound at selected other regions of the weatherseal. For example, magnetic powder can be added to the elastomeric compound along portions of the gripping fingers as represented by reference numerals 124a, 124b. The gripping fingers engage the mounting flange and thus the inclusion of the magnetic powder enhances the sealing capabilities of the structure. An additional magnetic, compliant appendage 126 is shown on one side of the carrier for engaging the flange where it merges in to the planar region of the mounting surface. It will be appreciated that while only a single appendage 126 is shown, additional appendages may be included on the same or opposite side as required.

The sealing portion 108 of the embodiment of FIG. 5 also illustrates the corrosion resistant feature described above. In this arrangement, the dense rubber from which the sealing portion 108 is formed includes magnetic powder in region 130. An outer or external surface 132 of the sealing portion that overlies the magnetic powder forms a continuous dense skin that serves as a corrosion resistant layer and prevents an undesired interaction between the magnetic layer and water or moisture encountered by the weatherseal.

The invention has been described with reference to the exemplary embodiments. Modifications and alterations will occur to others upon reading and understanding this specification. For example, the base, sealing portion, and appendage may adopt a wide array of configurations without departing from the present invention. For example, a dual attachment can be used as opposed to the single attachment described above. Alternately, the appendage may be an accordion-type bulb, as opposed to the solid cross-sectional configuration. The invention is intended to include all such modifications and alterations insofar as they come within the scope of the appended claim language or the equivalents thereof.

What is claimed is:

1. A weatherseal for sealing between facing, first and second surfaces, the seal comprising:
   an elastomeric base adapted for conforming to and engagement with an associated first surface;
   a seal portion extending from the base for selective engagement with an associated second surface when the first and second surfaces are disposed in close proximity; and
   an appendage extending from one of the base and seal portion, the appendage fabricated from a magnetic elastomer that is sufficiently flexible to conform to irregularities in an associated first surface, wherein the appendage is the only portion of the seal that is magnetized.

2. The weatherseal of claim 1 wherein the base, seal portion, and the magnetic appendage are coextruded.

3. The weatherseal of claim 1 wherein the magnetic appendage includes magnetic powder interspersed in an elastomer on the order of about 800 parts per hundred parts by weight rubber (phrs).

4. The weatherseal of claim 1 wherein the magnetic appendage forms an open channel with the base and seal portion to preclude water from passing beneath the weatherstrip base.

5. The weatherseal of claim 1 wherein the magnetic appendage includes a lip along an outer edge that protrudes outwardly from the remainder of the magnetic appendage for engaging an associated surface.

6. The weatherseal of claim 5 further comprising a thin web interconnecting the magnetic appendage to the weatherseal and allowing the magnetic appendage to pivot about the web relative to the remainder of the weatherseal.

7. The weatherseal of claim 1 further comprising attachment pegs received through the base at spaced locations therealong for mounting the weatherseal to an associated first surface.

8. The weatherseal of claim 1 wherein the magnetic appendage has a solid cross-section.

9. The weatherseal of claim 1 wherein the base, seal portion and magnetic appendage are integrally formed.

10. The weatherseal of claim 1 further comprising a corrosion resistant layer on the magnetic appendage.

11. The weatherseal of claim 10 wherein the corrosion resistant layer is applied as a coating.

12. The weatherseal of claim 11 wherein the corrosion resistant layer is an extruded thin cover of dense rubber.

13. The weatherseal of claim 11 wherein the corrosion resistant layer is a plastic film wrapped over the magnetic appendage.

14. The weatherseal of claim 1 wherein the magnetic appendage is an elastomer with a magnetic powder interspersed therethrough.

15. The weatherseal of claim 14 wherein the magnetic powder is one of neodymium iron boron, strontium ferrite, and barium ferrite.

16. The weatherseal of claim 14 wherein the elastomer is one of styrene-butadiene rubber (SBR), natural rubber (NR), polyisoprene (IR), butyl and halobutyl rubber (IIR), polychloroprene (CR) polybutadiene (BR), chlorinated and chlorosulfonated polyethylene (CSM), nitrile (NBR) and ethylene-propylene copolymer and terpolymer (EPDM).

17. The weatherseal of claim 1 has a flexibility range measured on the order of a hardness of about forty five (45) to fifty five (55) A.

18. The weatherseal of claim 1 has a flexibility range measured on the order of 100% Modulus of about 0.5 to 0.7 Mpa, a 200% Modulus of about 1.4 to 1.6 Mpa, and a 300% Modulus of about 2.2. to 2.5 Mpa.

19. The weatherseal of claim 1 wherein the magnetic appendage exhibits a magnetic pressure on the order of about 1.2 psi.

20. A vehicle sealing system for improving a seal between a weatherstrip and a mounting surface to which it is attached, the vehicle sealing system comprising:

a base adapted for facing, mating relation with an associated mounting surface;

a sealing bulb extending outwardly from the base and adapted for sealing engagement with an associated second surface;

a flexible, compliant seal lip operatively extending from the base and adapted for sealing engagement with the associated mounting surface, the seal lip, base, and sealing bulb integrally formed as a coextrusion, the seal lip including a magnetic material for urging the seal lip against the associated mounting surface and the seal lip being the only portion of the system that is magnetized; and a corrosion resistant layer over the magnetic material in the seal lip.

* * * * *